Sept. 28, 1937.  W. W. WOOD  2,094,088
VEHICLE SPRING SUSPENSION
Filed March 23, 1935
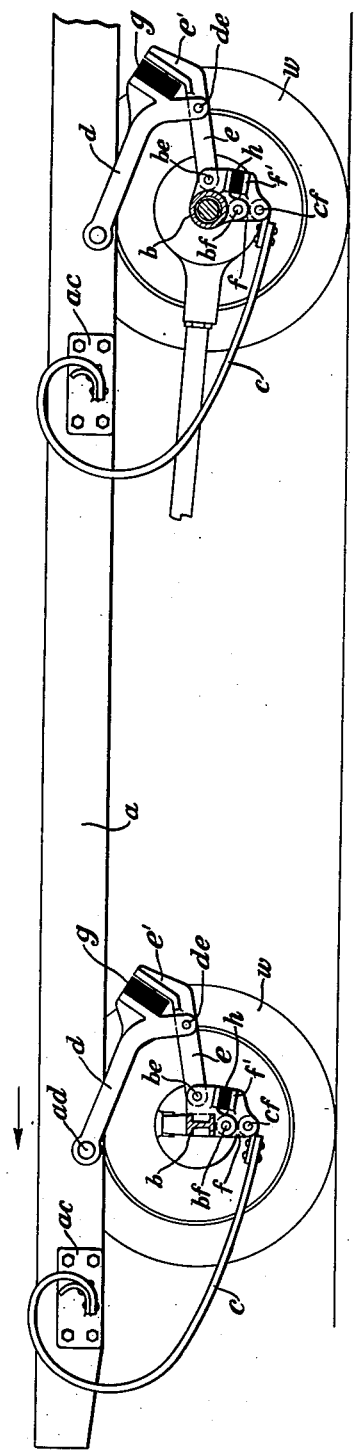
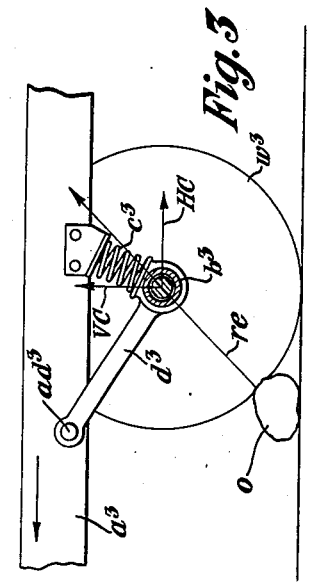
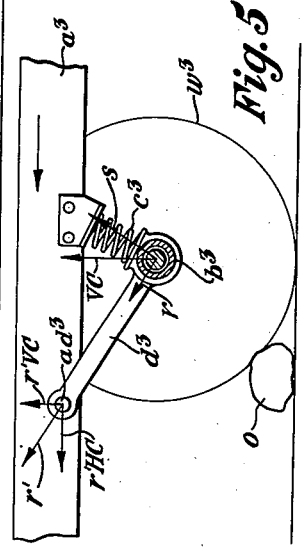
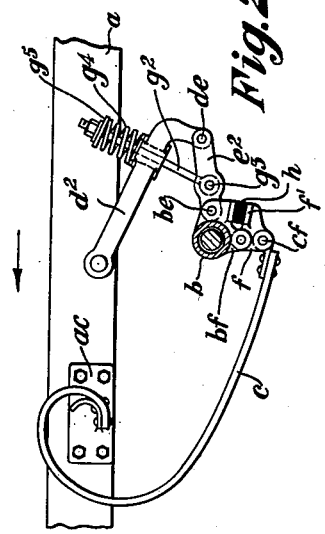
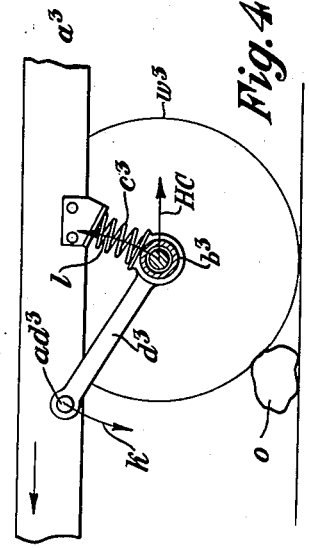
Inventor
W. W. Wood
By Frease and Bishop
Attorneys Patented Sept. 28, 1937

2,094,088

UNITED STATES PATENT OFFICE 2,094,088

VEHICLE SPRING SUSPENSION

Walter W. Wood, North Canton, Ohio

Application March 23, 1935, Serial No. 12,650

8 Claims. (Cl. 267—19)

The invention relates to supporting springs for automobiles and similar vehicles; and the object of the invention is to provide a spring suspension which will permit the axle to move horizontally backward from the normal, undisturbed position and forward again, in relation to the chassis or vehicle body, with freedom through an appreciable range.

The invention contemplates the provision of a spring suspension between the wheels and chassis of a vehicle, which will cause or permit the chassis to travel in a plane substantially parallel to the general plane of the road while one or other of the wheels is surmounting or riding over an obstacle in the road.

The above objects, together with others which will be apparent from the accompanying drawing and following description, or which may be hereinafter pointed out, may be attained by constructing the improved spring suspension in the manner illustrated in the accompanying drawing, in which Figure 1 is a longitudinal, sectional elevation of the chassis of an automobile showing the front axle and rear axle each provided with the improved spring suspension;

Fig. 2, a fragmentary sectional elevation showing the rear axle provided with a slightly modified form of the improved spring suspension;

Fig. 3, a diagrammatic view illustrating certain effects produced by an arrangement which while permitting or enforcing a lagging motion of the axle, confines that motion rigidly to the arc of a circle;

Fig. 4, a diagram of a construction such as shown in Fig. 3, illustrating the effect produced by the horizontal component applied to the axle or spindle; and Fig. 5, a similar diagram illustrating the effect produced by the vertical component applied to the axle or spindle.

Similar letters of reference refer to similar parts throughout the specification.

Referring first to Figure 1, the frame of the chassis or vehicle body is represented at $a$, and the front axle and rear axle housing are both designated by the reference letter $b$. Each corner portion of the frame is supported upon the axle or axle housing, as the case may be, by means of a spring, indicated at $c$, connected at its upper end to a bracket $ac$, attached to the frame, and at its lower end to the axle or axle housing $b$, adjacent to the corresponding wheel $w$.

This spring may be formed of one or more leaves, and may be flat or of any desired cross sectional shape, and must be of sufficient strength so that the four springs will support the entire weight of the chassis frame and body of the vehicle.

Control links $d$ and $e$ are located between the chassis or vehicle body and the axle or axle housing $b$, the primary control link $d$ being pivotally connected to the chassis as at $ad$ and to the secondary control link $e$ as at $de$, the link $e$ being pivotally connected to a suitable ear or lug upon the axle or axle housing $b$ as at $be$.

Instead of directly connecting the lower or rear end of the spring $c$ to the axle or axle housing $b$, a suspension link $f$ may be provided, the upper end thereof being pivotally connected to the axle or axle housing as at $bf$, the lower end of the link being pivotally connected to the end of the spring $c$ as at $cf$.

The control link $d$ is so shaped near its rear end as to provide a suitable anchorage for a large block of solid rubber or other cushion stop means the like indicated at $g$, and the rear end of the control link $e$ is extended upward angularly as at $e'$ so that when the link $e$ tends to revolve counter-clockwise about the pivot point $de$, the extension $e'$ engages the rubber block $g$ which forms a cushion stop preventing the link $e$ from revolving in that direction, relative to the link $d$, beyond a certain fixed point.

As an alternative form of this cushion stop or spring check, the control links may be constructed as shown at $d^2$ and $e^2$ in Fig. 2. The other parts of the spring structure may be the same as shown in Fig. 1 and are indicated by the same reference letters. A rod $g^2$ may be pivotally connected at its lower end to an intermediate point upon the link $e^2$, as at $g^3$ and extended up through a suitable opening in the link $d^2$, a coil spring $g^4$ being interposed between the link $d^2$ and a collar $g^5$ upon the rod. A one-way hydraulic dashpot or other well known check means would serve the same purpose.

The suspension link $f$ is preferably provided with an angular extension $f'$ arranged to engage a rubber bumper block $h$ anchored to a suitably provided surface on the axle or axle housing $b$ in such a position that it acts to prevent the suspension link $f$ from revolving counterclockwise relative to $b$, beyond a certain position, but permits free motion of the suspension link in a clockwise direction through a sufficient range for proper functioning of the mechanism.

In order to make clear the functioning of the device, attention is called to the fact that the force impressed on a wheel spindle by the reaction from impact of the wheel with a typical obstacle acts along a line lying substantially in a vertical plane, and passing through the point of contact of the tire with the obstacle and through the center of the wheel spindle.

This force may be considered as resolved into two components at right angles to each other, one being vertical or perpendicular to the road and acting as a deflecting force since it is at right angles to the normal direction of the vehicle's travel, while the other acts horizontally and parallel to the line of the vehicle's travel, but in the opposite direction to that in which the vehicle is moving.

In any mechanical arrangement of a spring suspension which does not permit the axle to move horizontally backward from the normal undisturbed position and forward again, in relation to the chassis or vehicle body, with freedom through an appreciable range, when a wheel of the vehicle encounters an obstacle upon the road, the horizontal component is absorbed as modified shock, and the energy so used is a direct subtraction from that applied to the propulsion of the vehicle.

In order to illustrate certain effects produced or obtained by such an arrangement which allows the axle to yield substantially in the direction of the reactive force impressed on it by the impact of the wheel against an obstacle but which confines the motion of the axle with respect to the chassis or vehicle body to the arc of a circle described by the axle around a pivot point in the frame, diagrammatic views showing these effects are included in the accompanying drawing as Figs. 3, 4 and 5.

These figures show a section of the vehicle frame $a^3$, a wheel $w^3$ and a link $d^3$ pivotally connected at one end to the frame at $ad^3$ and connected at its other end to the axle or axle housing $b^3$.

The frame $a^3$ is shown supported by a helical spring $c^3$ which may be assumed as offering no serious interference to a moderate amount of backward and forward motion by the wheel and axle relative to the frame. The control link $d^3$, however, confines the motion of the axle with respect to the frame to the arc of a circle described by the axle around the pivot $ad^3$ as a center.

Referring first to Fig. 3, it will be seen that with the vehicle moving in the direction of the arrow shown on the frame, when the wheel $w^3$ encounters an obstacle as indicated at $o$, the reaction from the impact of the wheel with the obstacle acts along a line passing through the point of contact of the tire with the obstacle and through the center of the wheel spindle, as indicated by the line $re$ in Fig. 3. For the purpose of analysis and discussion, this force may be considered as resolved into two components at right angles to each other, namely the vertical component VC and the horizontal component HC.

The effect of each component will be considered separately. In Fig. 4 is shown the effect produced by the horizontal component applied to the wheel spindle or axle. Since the horizontal component tends to check the forward motion of the axle, while the frame and body of the car are impelled forward by their own inertia, as the wheel and frame are connected by the link $d^3$, the pivot $ad^3$ tends to revolve around the spindle or axle $b^3$ as a center and swings downward along the path indicated by the curved arrow $k$, which motion produces, in effect, a definite downward pull on the frame $a^3$, and which tends to neutralize any upthrust received by the frame from the vertical component. Conversely, the spindle or axle $b^3$ tends to swing upward, around the pivot $ad^3$ as a center, as shown by the curved arrow $l$, and this effect acts to lift the wheel over the obstacle.

In Fig. 5 is shown the effect produced by the vertical component applied to the axle or wheel spindle. A part of this vertical component will obviously be transmitted to the frame through the helical spring $c^3$ which holds the frame and axle apart. However, on resolving this force into the components $r$ and $s$, two special effects may be noted; first, the component $s$ will force the axle upward, compressing the helical spring and causing the axle to travel in an arc around the pivot $ad^3$ as a center, but this motion itself being oblique has a horizontal component, that is, in swinging about $ad^3$ as a center, $b^3$ recedes or travels backward a certain amount with respect to $a^3$.

It is important to note that this backward travel is one of the effects derived from a purely vertical force impressed upon $b^3$. Its significance is that by suitable design the vertical component may be made to assist in starting the rearward motion, or lag, of the axle with respect to the frame. This is of value because it increases the amount of neutralizing action which may be obtained in the case of very small obstacles, where the ratio of HC to VC is small.

The other special effect is due to the component $r$ which acts longitudinally along the link $d^3$ and is delivered to the pivot $ad^3$, as indicated by the arrow at $r'$ and may itself be resolved into horizontal and vertical component forces as indicated by the arrows $r'HC$ and $r'VC$ respectively. The force $r'HC$ pushes ahead on the frame $a^3$ and is merely the converse of that component of force $s$ which causes the lag, but $r'VC$ is a vertical force impressed on the frame $a^3$, and in the mechanical arrangement of Figs. 3, 4, and 5, is uncushioned. It would then be received as shock, and in any arrangement making the advantages of the link $d^3$ available, would have to be cushioned.

Now, considering the mechanical arrangement shown in Fig. 1, if a purely vertical force be impressed on the axle $b$, forcing it upward, it carries the pivot $cf$ with it by the suspension link $f$, but due to the shape and position of the spring $c$, $cf$ tends to swing about the bracket $ac$, or an intermediate point nearly in the position of $ac$, as a center. This tendency brings into play the forces explained in connection with Fig. 4 and causes a certain amount of lag on the part of the axle $b$, as the result of a purely vertical force impressed on the axle. At the same time, the shape of the spring $c$ furnishes the cushioning effect above referred to for the force $r'VC$ of Fig. 5.

The major part of the vertical component, however, is transmitted to the frame $a$ through the spring $c$. If a horizontal force be applied to the axle $b$, the suspension link $f$ permits a moderate amount of horizontal motion toward the rear, to the axle $b$, without any appreciable motion being transmitted to the spring $c$, because of the interposition of the link $f$ between the axle $b$ and the point $cf$.

Therefore, the effect of a horizontal component impressed on the axle $b$ is transmitted to the frame $a$ almost entirely through the control links $e$ and $d$, producing the effect indicated by the curved arrows in Fig. 4. It is now evident that the mechanical arrangement of Fig. 1 acts to separate the vertical component and the horizontal component, transmitting each to the frame by a separate route, except that by the introduction of the anti-clockwise stop between the link *f* and the axle *b*, the vertical component is made to exert a certain horizontal force toward the rear, on the axle *b*, assisting the lagging effect produced mainly by the horizontal component.

The exact shape of the spring *c* is of importance. This will be evident from a consideration of the train of events happening while the wheel is passing over an obstacle. At the moment of contact of the tire with the obstacle, the rearward inclination of the line of reactive force, passing through the point of contact of the tire with the obstacle and through the spindle center, is greatest and the spring *c* should be so mounted that the direction of easiest yield of the pivot *cf* will correspond as nearly as possible with the direction of the line of reactive force. This involves in the design, the selection of the maximum size of obstacle for which it is desirable to design the device. This direction of easiest yield is roughly at right angles to a line passing through the pivot *cf* and through or near the bracket *ac*.

Next considering the conditions when the wheel has partially surmounted the obstacle, it is at once evident that as the wheel rises in passing over the obstacle, the direction of the line of reactive force shifts toward the vertical, and also that the magnitude of the reactive force becomes progressively less. But while this is happening, the spring *c* is being flexed or tightened, and the line through *ac* and *cf* is also changing in direction, as *f* rises toward *a*, which results in the line of reactive force tending, throughout the passage of the wheel over the obstacle, to remain always approximately perpendicular to the line *ac—cf*, or in other words, the reactive force is always exerted more or less in the direction of the easiest yield of the pivot *cf*, throughout the entire duration of the reactive force.

In consequence of the introduction of the control links *d* and *e* and accessory features, and the shape and position of the spring *c*, the downward pull on the frame *a*, which was discussed in relation to Fig. 4, is enabled to counteract the upthrust received by the frame from an obstacle, in a highly effective manner, and experience has proven that this counteracting or neutralizing effect is controlled by proper design to such a degree that under average road conditions, passage of the car over obstacles results in no disturbance to the horizontal line of motion of the car body.

I claim:

1. In combination with a vehicle frame, an axle, a wheel carried by the axle, a spring suspension including a spring connected at its forward end only to the frame and pivotally connected at its rear end to the axle and constructed so as to allow the axle relatively free movement upward or rearward or in any intermediate upward and rearward direction, a control link pivoted at its forward end to the frame and means connecting the rear end of said link to the axle whereby the link acts to pull downward on the frame and upward on the axle when the rear end of the link receives the horizontal component of the reactive force from an obstacle encountered by the wheel.

2. In combination with a vehicle frame, an axle, a wheel carried by the axle, a spring suspension including a spring connected only at its forward end to the frame and at its rear end to the axle and constructed so as to allow the axle relatively free movement upward or rearward of in any intermediate upward and rearward direction, a primary control link pivoted at its forward end to the frame, and a secondary control link connecting the rear end of the primary control link to the axle, whereby the primary control link acts to pull downward on the frame and upward on the axle when its rear end receives the horizontal component of the reactive force from an obstacle encountered by the wheel, and the secondary control link acts to prevent any appreciable part of the vertical component of said reactive force from being communicated to the primary control link, but delivers the horizontal component of said reactive force to the rear end of the primary control link.

3. In a combination with a vehicle frame, an axle, a wheel carried by the axle, a spring suspension including a spring connected at its forward end to the frame and at its rear end to the axle, a primary control link pivoted at its forward end to the frame, and a secondary control link connecting the rear end of the primary control link to the axle, whereby the primary control link acts to pull downward on the frame and upward on the axle when its rear end receives the horizontal component of the reactive force from an obstacle encountered by the wheel, and the secondary control link acts to prevent any appreciable part of the vertical component of said reactive force from being communicated to the primary control link, but delivers the horizontal component of said reactive force to the rear end of the primary control link and cushion stop means between the primary control link and the secondary control link whereby the secondary control link is prevented from revolving in one direction beyond a certain point relative to the primary control link.

4. In combination with a vehicle frame, an axle, a wheel carried by the axle, a spring suspension including a spring connected at its forward end only to the frame, and at its rear end to the axle and constructed so as to allow the axle relatively free movement upward or rearward or in any intermediate upward and rearward direction, a control link pivoted at its forward end to the frame, and means connecting the rear end of said control link to the axle, said means being so constructed and said spring being so shaped and positioned that the link acts to pull downward on the frame and upward on the axle when the rear end of the link receives the horizontal component of the reactive force from an obstacle encountered by the wheel and the vertical component of said reactive force will assist in creating a rearward movement of the axle relative to the frame.

5. In combination with a vehicle frame, an axle, a wheel carried by the axle, a spring suspension including a spring connected at its forward end to the frame, a suspension link connecting the rear end of the spring to the axle and acting to prevent any appreciable part of a reactive force received by the axle from being delivered to the spring, the spring being constructed so as to allow the axle relatively free movement upward or rearward or in any intermediate upward and rearward direction, a primary control link pivoted at its forward end to the frame, and a secondary control link connecting the rear end of the primary control link to the axle, whereby the primary control link acts to pull downward on the frame and upward on the axle when its rear end receives the horizontal component of the reactive force from an obstacle encountered by the wheel, and the secondary control link acts to prevent any appreciable part of the vertical component of said reactive force from being communicated to the primary control link, but delivers the horizontal component of said reactive force to the rear end of the primary control link.

6. In combination with a vehicle frame, an axle, a wheel carried by the axle, a spring suspension including a spring connected at its forward end to the frame, a suspension link connecting the rear end of the spring to the axle and acting to prevent any appreciable part of a reactive force received by the axle from being delivered to the spring, a primary control link pivoted at its forward end to the frame, and a secondary control link connecting the rear end of the primary control link to the axle, whereby the primary control link acts to pull downward on the frame and upward on the axle when its rear end receives the horizontal component of the reactive force from an obstacle encountered by the wheel, and the secondary control link acts to prevent any appreciable part of the vertical component of said reactive force from being communicated to the primary control link, but delivers the horizontal component of said reactive force to the rear end of the primary control link and cushion stop means between the suspension link and the axle preventing movement of the link in one direction relative to the axle beyond a certain point.

7. In combination with a vehicle frame, an axle, a wheel carried by the axle, a spring suspension including a spring connected at its forward end to the frame, a suspension link connecting the rear end of the spring to the axle and acting to prevent any appreciable part of a reactive force received by the axle from being delivered to the spring, a primary control link pivoted at its forward end to the frame, and a secondary control link connecting the rear end of the primary control link to the axle, whereby the primary control link acts to pull downward on the frame and upward on the axle when its rear end receives the horizontal component of the reactive force from an obstacle encountered by the wheel, and the secondary control link acts to prevent any appreciable part of the vertical component of said reactive force from being communicated to the primary control link, but delivers the horizontal component of said reactive force to the rear end of the primary control link and cushion stop means between the primary control link and the secondary control link whereby the secondary control link is prevented from revolving in one direction beyond a certain point relative to the primary control link.

8. In combination with a vehicle frame, an axle, a wheel carried by the axle, a spring suspension including a spring connected at its forward end to the frame, a suspension link connecting the rear end of the spring to the axle and acting to prevent any appreciable part of a reactive force received by the axle from being delivered to the spring, a primary control link pivoted at its forward end to the frame, and a secondary control link connecting the rear end of the primary control link to the axle, whereby the primary control link acts to pull downward on the frame and upward on the axle when its rear end receives the horizontal component of the reactive force from an obstacle encountered by the wheel, and the secondary control link acts to prevent any appreciable part of the vertical component of said reactive force from being communicated to the primary control link, but delivers the horizontal component of said reactive force to the rear end of the primary control link, cushion stop means between the suspension link and the axle preventing movement of the link in one direction relative to the axle beyond a certain point, and cushion stop means between the primary control link and the secondary control link whereby the secondary control link is prevented from revolving in one direction beyond a certain point relative to the primary control link.

WALTER W. WOOD.